US012395042B2

United States Patent
Garcia-Herreros et al.

(10) Patent No.: US 12,395,042 B2
(45) Date of Patent: Aug. 19, 2025

(54) COOLING CAGE ASSEMBLY FOR A ROTARY ELECTRIC MOTOR

(71) Applicant: ETEL S.A., Môtiers (CH)

(72) Inventors: Iván Garcia-Herreros, Saint-Sulpice (CH); Dmitry Chechenev, Neuchâtel (CH); Loïc Moreno, Pontarlier (FR); Johann Pourchet, La Chaux de Gilley (FR); Manish Mittal, Neuchâtel (CH); Daniele Veronesi, Corcelles (CH); Xinchang Liu, Couvet (CH)

(73) Assignee: ETEL S.A., Môtiers (CH)

( * ) Notice: Subject to any disclaimer, the term of this patent is extended or adjusted under 35 U.S.C. 154(b) by 324 days.

(21) Appl. No.: 18/097,712

(22) Filed: Jan. 17, 2023

(65) Prior Publication Data
US 2023/0246521 A1    Aug. 3, 2023

(30) Foreign Application Priority Data

Jan. 28, 2022 (EP) ..................... 22153829

(51) Int. Cl.
| H02K 9/19 | (2006.01) |
| H02K 1/20 | (2006.01) |
| H02K 5/20 | (2006.01) |

(52) U.S. Cl.
CPC ............... H02K 9/19 (2013.01); H02K 1/20 (2013.01); H02K 5/203 (2021.01)

(58) Field of Classification Search
CPC .. H02K 9/19; H02K 1/20; H02K 5/20; H02K 5/203; H02K 1/16
See application file for complete search history.

(56) References Cited

U.S. PATENT DOCUMENTS

| 6,954,010 B2 | 10/2005 | Rippel |
| 8,378,534 B2 | 2/2013 | Houle |
| (Continued) |

FOREIGN PATENT DOCUMENTS

| CN | 106160314 A | 11/2016 |
| DE | 2542483 A1 | 4/1977 |
| (Continued) |

OTHER PUBLICATIONS

European Search Report issued in corresponding EP Patent Application No. 22153829, dated Jul. 19, 2022, pp. 1-2.

*Primary Examiner* — Tulsidas C Patel
*Assistant Examiner* — Joshua Kiel M Rodriguez
(74) *Attorney, Agent, or Firm* — Carter, DeLuca & Farrell LLP

(57) ABSTRACT

A cooling cage assembly for a rotary electric motor includes a cooling stator arrangement, and a first cylindrical part and a second cylindrical part fixedly mounted against respective opposite sides of the cooling stator arrangement. The cooling stator arrangement includes a stator and cooling tiles mounted against and around the outer circumference of the stator. Each cooling tile includes at least one channel extending from an upper side to a lower side of the cooling tile. The cooling cage assembly further includes a first plurality of fluidic bridges arranged on the upper side of the cooling tiles and a second plurality of fluidic bridges arranged on the lower side of the cooling tiles to form, together with the channel(s) of the cooling tiles, a serpentine flow path, for a cooling fluid, around the outer circumference of the stator.

21 Claims, 4 Drawing Sheets

(56) References Cited

U.S. PATENT DOCUMENTS

| | | |
|---|---|---|
| 9,362,788 B2 | 6/2016 | Shoykhet |
| 10,608,495 B2 | 3/2020 | Yagyu |
| 2001/0005104 A1* | 6/2001 | Nakahara ............... H02K 1/16 |
| | | 310/216.136 |
| 2003/0222519 A1 | 12/2003 | Bostwick |
| 2008/0278011 A1* | 11/2008 | Elgas ................... H02K 5/203 |
| | | 310/52 |
| 2009/0079278 A1 | 3/2009 | Kramer |
| 2010/0007227 A1 | 1/2010 | Smith |
| 2013/0342047 A1 | 12/2013 | Fernandes |
| 2014/0354090 A1 | 12/2014 | Chamberlin |
| 2022/0209627 A1* | 6/2022 | Vuong .................. H02K 9/197 |
| 2023/0275475 A1* | 8/2023 | Büttner ................. H02K 5/15 |
| | | 310/91 |

FOREIGN PATENT DOCUMENTS

| | | |
|---|---|---|
| DE | 102007035271 A1 | 1/2009 |
| EP | 1154548 B1 | 11/2001 |
| EP | 2680408 A1 | 1/2014 |
| EP | 3396819 A1 | 10/2018 |

\* cited by examiner

COOLING CAGE ASSEMBLY FOR A ROTARY ELECTRIC MOTOR

CROSS-REFERENCE TO RELATED APPLICATIONS

The present application claims priority to Application No. 22153829.1, filed in the European Patent Office on Jan. 28, 2022, which is expressly incorporated herein in its entirety by reference thereto.

FIELD OF THE INVENTION

The present invention relates to a cooling cage assembly for a rotary electric motor and to a rotary electric motor including a cooling cage assembly.

BACKGROUND INFORMATION

In certain conventional rotary electric motors, a stator lamination is installed inside a motor housing or cage. The assembly of the cage around the stator lamination is achieved by an interference fit operation, in which the cage is first heated to expand its diameter and arranged around the stator lamination. A shrink fit is obtained on the stator lamination as the cage temperature reaches the ambient temperature to guarantee efficient thermal contact and provide enough friction to withstand the torque on the stator.

As temperature changes during operation of the motor, the diameter of the cage slightly increases, thereby decreasing the amount of interference or contact between the stator lamination and the cage. This is acceptable for most applications since, generally, both the stator lamination and cage are made on ferrous alloys with a similar thermal expansion coefficient (CTE), and environmental temperature variations in which the motor is operating are limited as the motor is often installed in a temperature-regulated production site.

However, for transportation applications, such as in the aviation industry, both the mass and temperature requirements are different than for stationary applications. Thus, the use of ferrous alloys for both the stator lamination and housing is a limiting factor.

A cooling cage for preventing or at least reducing thermal expansion of both the stator lamination and cage is a conventional approach. Cooling cages are, for example, described in U.S. Patent Application Publication No. 2003/0222519, European Patent Document No. 2 680 408, and U.S. Patent Application Publication No. 2013/0342047.

To avoid having two parts with a stator lamination and housing, European Patent Document No. 1 154 548 describes integrating the cooling pipes directly within the stator lamination with cast aluminum around the pipes. U.S. Pat. No. 6,954,010 describes a similar approach.

German Patent Document No. 25 42 483 describes a cooling arrangement that includes external ribbed tiles fixed to the outer circumference of the stator with an adhesive. The ribbed tiles are profiled aluminum extrusions cut to the length required for the stator.

SUMMARY

Example embodiments of the present invention provide a cooling cage assembly for a rotary electric motor.

According to an example embodiment of the present invention, a cooling cage assembly for a rotary electric motor includes a cooling stator arrangement and a first cylindrical part and a second cylindrical part fixedly mounted against respective opposite sides of the cooling stator arrangement. The cooling stator arrangement includes a stator and cooling tiles mounted against and around the outer circumference of the stator. Each cooling tile includes at least one channel extending from an upper side to a lower side of the cooling tile. The cooling cage assembly further includes a first plurality of fluidic bridges and a second plurality of fluidic bridges arranged respectively on the upper side and on the lower side of the cooling tiles to form, together with the channel of respective cooling tiles, a serpentine flow path for a cooling fluid around the outer circumference of the stator.

According to example embodiments, each cooling tile includes a first channel and a second channel extending from the upper side to the lower side of the cooling tile. Each fluidic bridge of the first plurality of fluidic bridges is in fluid communication with the first and second channels of respective cooling tiles. Each fluidic bridge of the second plurality of fluidic bridges is in fluid communication with one channel of respective cooling tiles and with one channel of an adjacent cooling tile to form the serpentine flow path.

According to example embodiments, the first plurality of fluidic bridges includes first arcuate recesses arranged on an end side of one of the first and second cylindrical parts. The first arcuate recesses are regularly spaced apart from each other over 360°. The second plurality of fluidic bridges includes second arcuate recesses arranged on an end side of the other of the first and second cylindrical parts. The second arcuate recesses are regularly spaced apart from each other over 360°. The first arcuate recesses are angularly offset with respect to the second arcuate recesses.

According to example embodiments, the cooling cage assembly further includes a first ring and a second ring. The first ring includes first arcuate sealing portions arranged to cover and seal the arcuate recesses of one of the first and second cylindrical parts. Each first arcuate sealing portion includes a first aperture and a second aperture, which are part of one of the first and second plurality of fluidic bridges. The second ring includes second arcuate sealing portions arranged to cover and seal the arcuate recesses of the other of the first and second cylindrical parts. Each second arcuate sealing portion includes a first aperture and a second aperture, which are part of the other of the first and second plurality of fluidic bridges.

According to example embodiments, the first ring is mounted between the first cylindrical part and the cooling stator arrangement. The first arcuate sealing portions are mounted against the lower side of respective cooling tiles with the first and second apertures aligned with the first and second channels to form, together with respective first arcuate recesses of the first cylindrical part, the first plurality of fluidic bridges. The second ring is mounted between the second cylindrical part and the cooling stator arrangement. The second arcuate sealing portions are mounted partially against the upper side of two adjacent cooling tiles with the first and second apertures aligned respectively with the first channel of one cooling tile and the second channel of an adjacent cooling tile to form, together with respective second arcuate recesses of the second cylindrical part, the second plurality of fluidic bridges.

According to example embodiments, the side of the first ring mounted against the lower side of each cooling tile includes a shoulder around each aperture of respective first arcuate sealing portions. A sealing gasket is arranged and squeezed against the shoulder of each aperture and against the lower side of respective cooling tiles.

According to example embodiments, the first cylindrical part includes a shoulder around each first arcuate recess. An arcuate sealing gasket is arranged and squeezed against the shoulder of each first arcuate recess and against a flat surface of the first ring.

According to example embodiments, the second arcuate sealing portions of the second ring includes arcuate grooves. An arcuate sealing gasket is mounted inside each arcuate groove and squeezed against a flat surface of the second cylindrical part.

According to example embodiments, the upper side of each cooling tile includes a first aperture and a second aperture opening into the first and second channels of the tile. A shoulder is arranged around the first and second apertures of each tile. A sealing gasket is arranged and squeezed against the shoulder of each aperture of respective cooling tiles and against a flat surface of the second ring.

According to example embodiments, the stator includes radial extensions. An inner side of the cooling tiles is mounted against a tile receiving surface between two radial extensions.

According to example embodiments, each cooling tile is made of a deformable material such as aluminum. The radius of curvature of the inner side of each cooling tile is smaller than the radius of curvature of the corresponding tile receiving surface before assembly. The cooling tiles are screwed against the respective receiving surfaces such that the inner side of the tiles are bent to the shape of the tile receiving surfaces.

According to example embodiments, the cooling tiles are assembled against a respective tile receiving surface by a sliding dovetail.

According to example embodiments, each cooling tile includes a socket extending along an inner side from the upper to the lower side of the tile. Each tile receiving surface includes a tail slidably mounted into the socket of respective cooling tiles.

According to example embodiments, the stator includes a cylindrical part and teeth extending from an inner side of the cylindrical part along a radial direction. The thickness of the cylindrical part between the tile receiving portion and the inner side of the cylindrical part is lower than a third of the length of the teeth along the radial direction.

According to example embodiments, one of the first and second cylindrical parts further includes an inlet and an outlet port in fluid communication with the cooling stator arrangement.

According to an example embodiment of the present invention, a rotary electric motor includes a cooling cage assembly as described herein.

Further features and aspects of example embodiments of the present invention are described in more detail below with reference to the appended schematic Figures.

DETAILED DESCRIPTION

Figure 1:
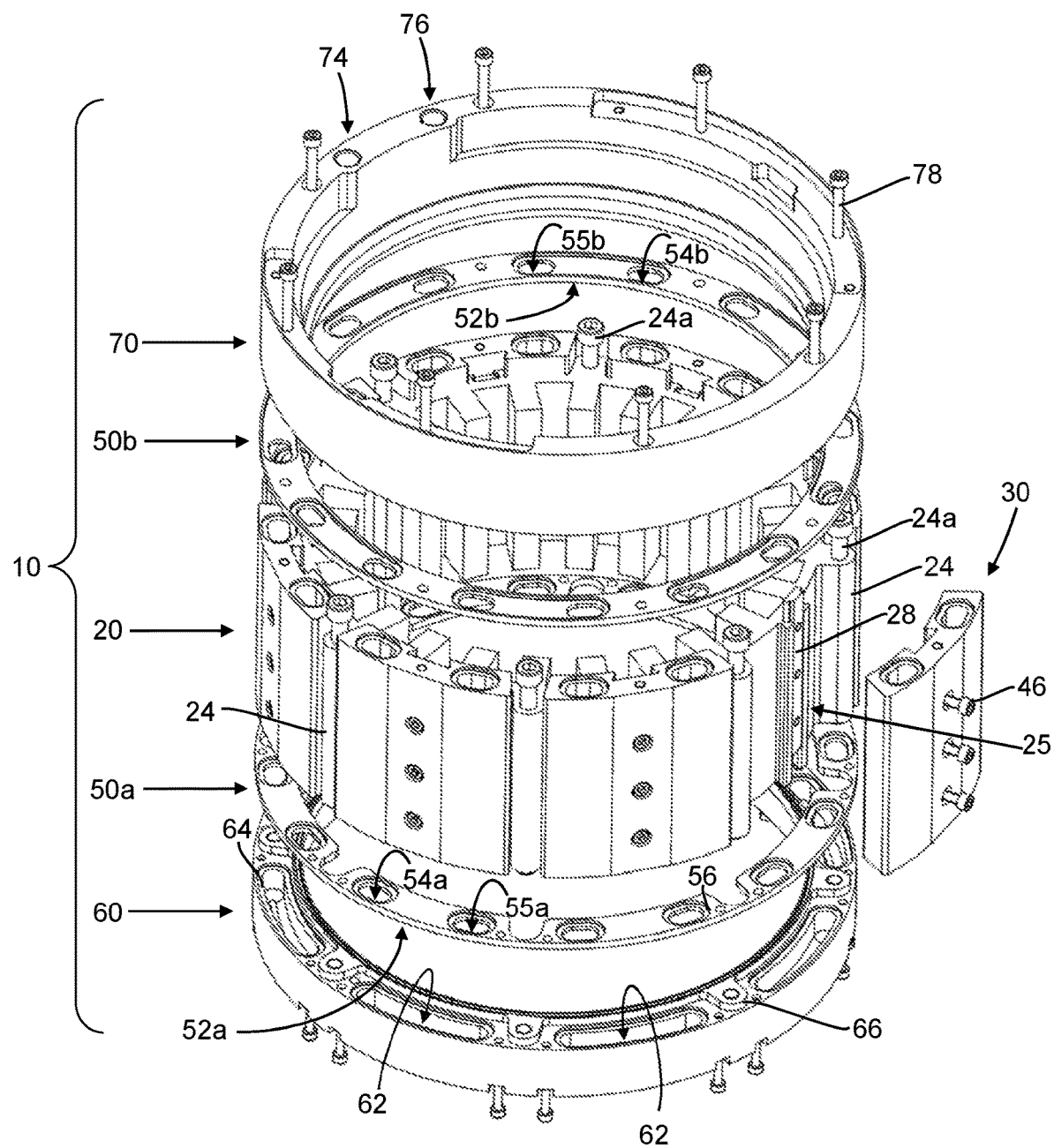
FIG. 1 is an exploded perspective view of a cooling cage assembly, including a cooling stator arrangement and a first cylindrical part and a second cylindrical part mounted on both sides of the cooling stator arrangement, according to an example embodiment of the present invention.

With reference to FIG. 1, the cooling cage assembly 10 is adapted for use in connection with a rotary electric motor and includes a cooling stator arrangement 20, a first cylindrical part 60 fixedly mounted against a first side of the cooling stator arrangement 20, and a second cylindrical part 70 fixedly mounted against a second opposite side of the cooling stator arrangement 20.

Figure 2:
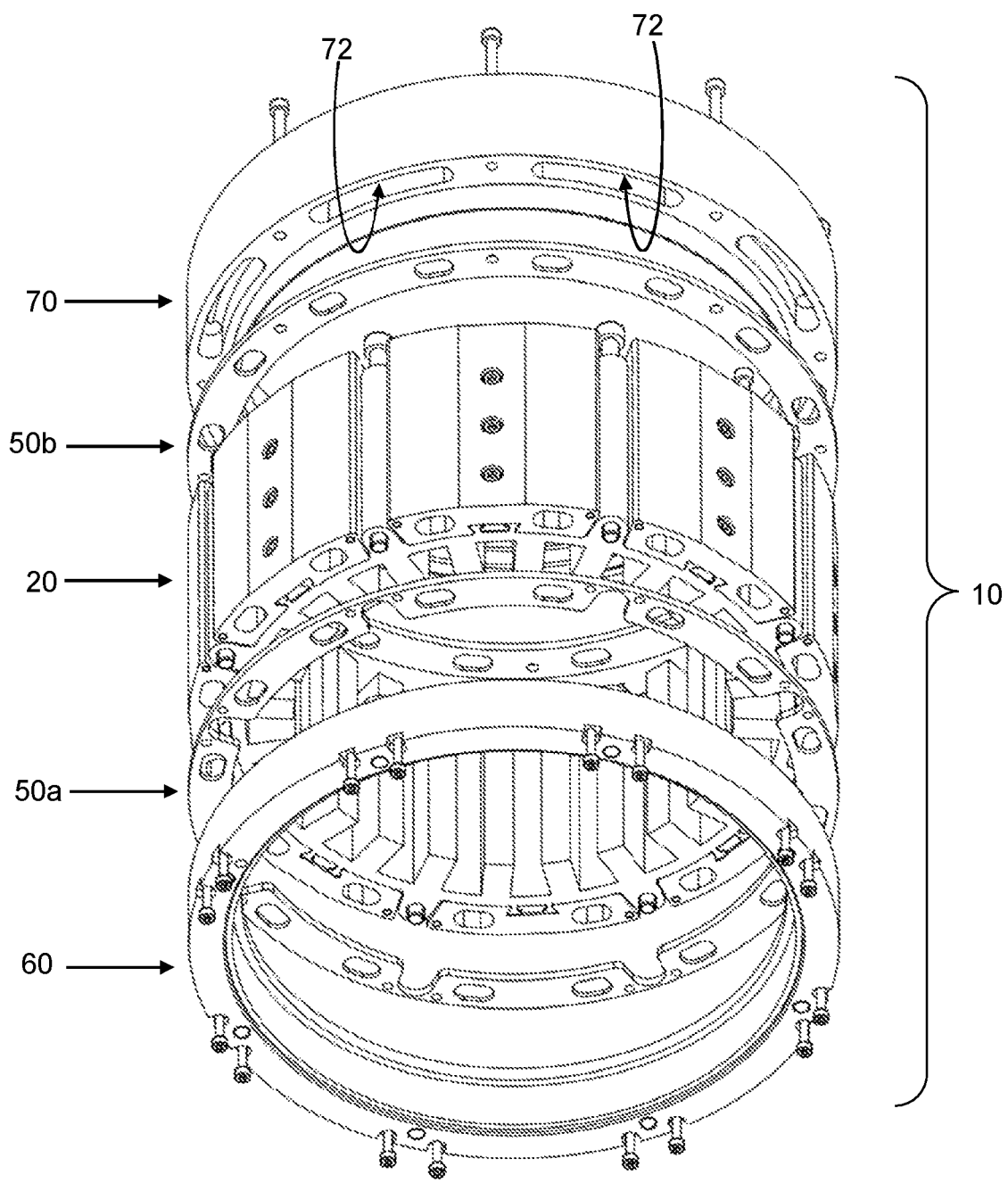
FIG. 2 is another exploded perspective view of the cooling cage assembly.
Figure 3:
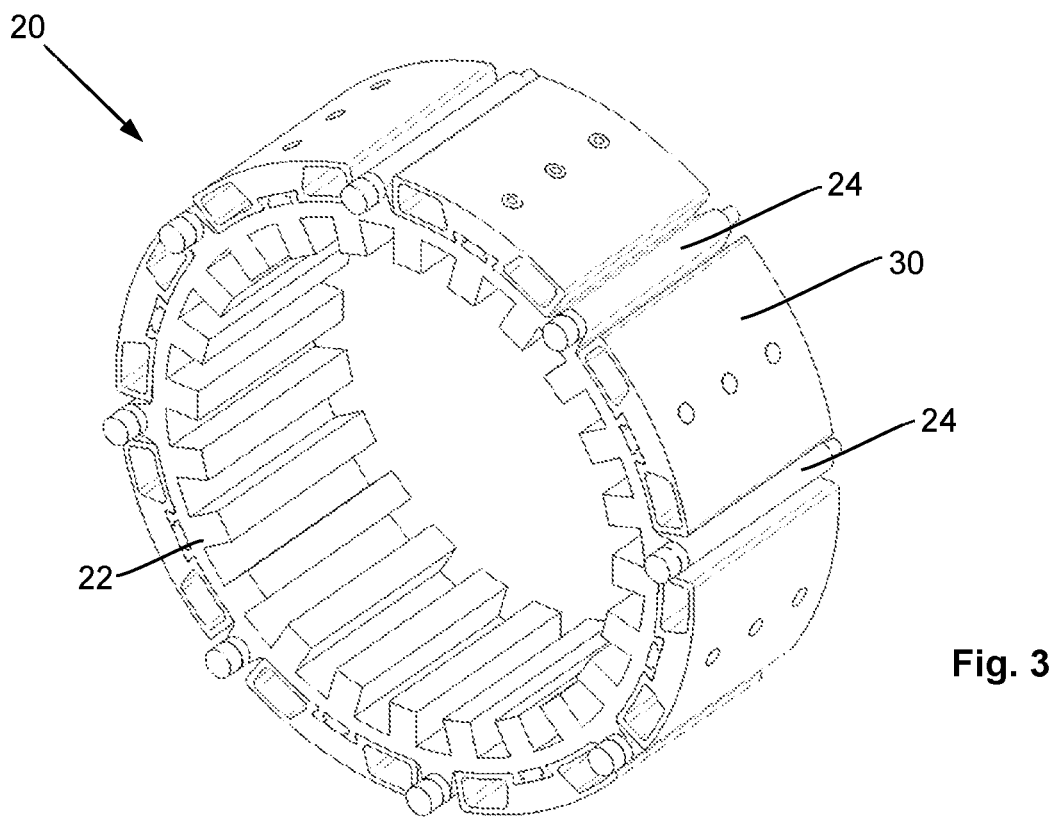
FIG. 3 is a perspective view of the cooling stator arrangement of the cooling cage assembly.

As illustrated in FIGS. 1 to 3, the cooling stator arrangement 20 includes a stator 22 made of a lamination stack and cooling tiles 30, which may be, for example, formed of aluminum to reduce the overall weight of the cooling cage assembly. These cooling tiles 30 are mounted against and around an outer cylindrical wall of stator 22. The first and second cylindrical parts 60, 70 and the cooling tiles 30 are configured to form a serpentine flow path for a cooling fluid around the circumference of cylindrical wall of the stator 22 to efficiently cool-down the rotary electric motor when operating.

Figure 4:
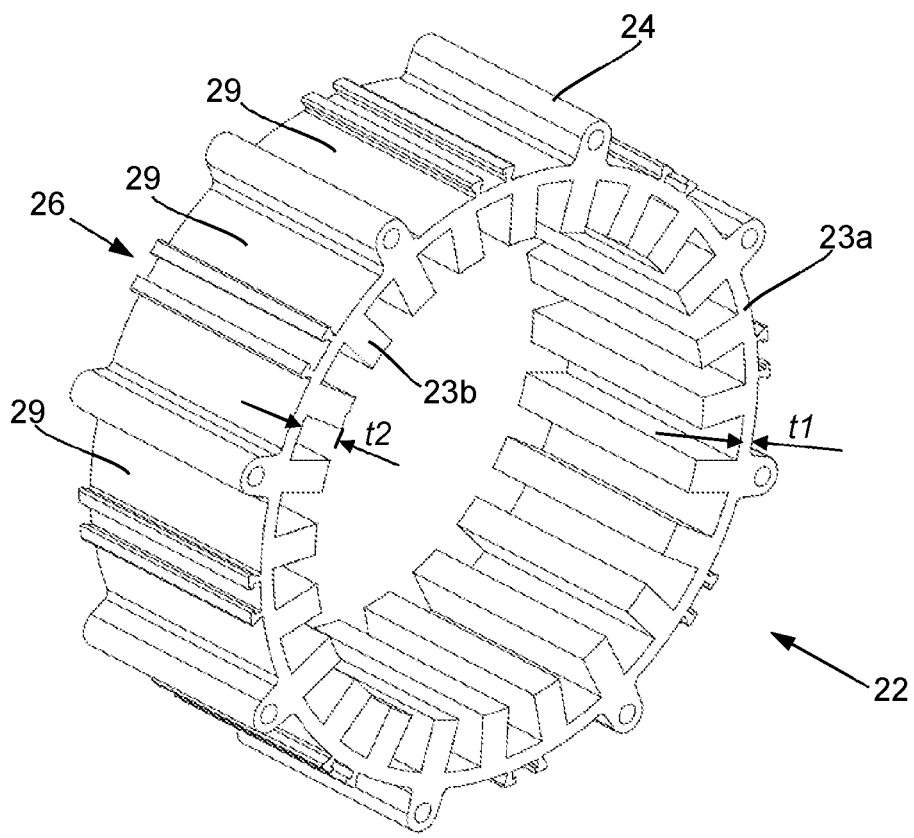
FIG. 4 is a perspective of the cooling stator arrangement without the cooling tiles.
Figure 5:
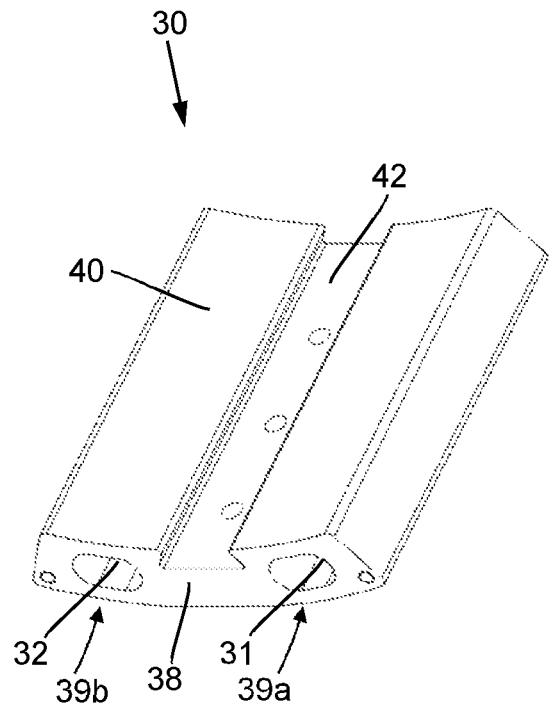
FIG. 5 is a perspective view of a cooling tile from its inner side.
Figure 6:
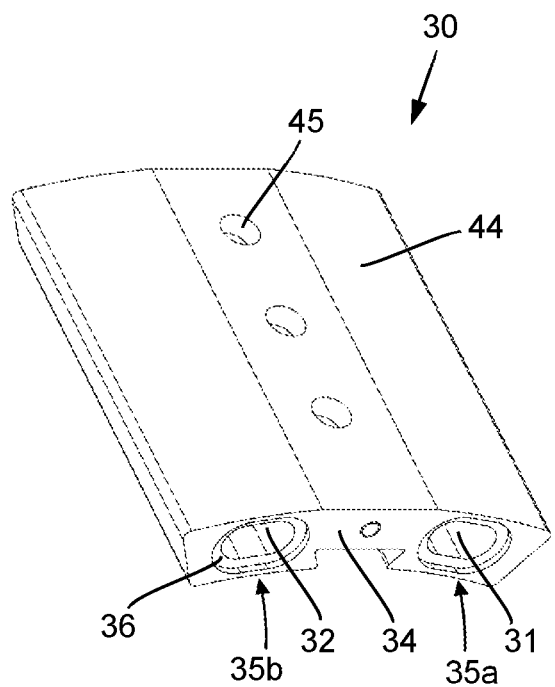
FIG. 6 is a perspective view of the cooling tile from its outer side.

Each cooling tile 30 is assembled to a corresponding tile receiving surface 29 on the outer cylindrical wall of the stator, for example, by a sliding dovetail joint. To this end, as illustrated in FIGS. 5 and 6, each cooling tile 30 includes a socket 42 extending along the middle of an inner side 40 from an upper side 34 to a lower side 38 of the cooling tile. Each tile receiving surface 29 includes a tail 25 (see, e.g., FIG. 1) slidably mounted into the socket 42 of respective cooling tiles 30. The tail 25 includes a rail 26 as illustrated in FIG. 4, which is integral with the stator, and a rod 28 slidably mounted inside the rail 26. Each cooling tile 30 includes through-holes 45 receiving screws 46, which are screwed into the corresponding rod 28 such that the cooling tiles 30 are firmly secured to the stator 22.

The radius of curvature of the inner side 40 of each cooling tile 30, along a direction orthogonal to the lateral sides of the tile, is smaller than the radius of curvature of the corresponding tile receiving surface 29 before assembly. The cooling tiles 30 are first assembled to the stator 22 by sliding the tail 25 of respective tile receiving surfaces 29 into the socket 42 of respective cooling tiles 30. The inner side 40 of the tiles are then bent to the shape of the tile receiving surfaces 29 upon the screwing operation to ensure an optimal thermal contact between the cooling tiles 30 and the stator 22.

With reference to FIGS. 5 and 6, the upper side 34 of each cooling tile 30 includes a first aperture 35*a* and a second aperture 35*b* opening into a first channel 31 and a second channel 32 arranged to extend parallelly from each other to open to a first aperture 39*a* and a second aperture 39*b* located on the lower side 38 of the tile.

The cooling cage assembly 10 further includes a first plurality of fluidic bridges arranged to provide a fluid communication between the first and second channels 31, 32 of each cooling tile 30 and a second plurality of fluidic bridges to provide a fluid communication between one channel 31 of each cooling tile 30 and one channel 32 of an adjacent cooling tile 30 so as to create the serpentine flow path.

In the illustrated example embodiment, the first cylindrical part 60 includes an annular side mounted against one side of the stator cooling arrangement 20. Arcuate recesses 62 are arranged and regularly spaced apart from each other over 360° on this annular side as illustrated in FIG. 1. The second cylindrical part 70 includes an annular side mounted against the opposite side of the stator cooling arrangement 20. With reference to FIG. 2, arcuate recesses 72 are arranged and regularly spaced apart from each other over 360° on this annular side. The arcuate recesses 72 of the second cylindrical part 70 are angularly offset with respect to the arcuate recesses 62 of the first cylindrical part 60 such that the arcuate recesses of the first and second cylindrical parts 60, 70 partly form, respectively, the first and second plurality of fluidic bridges.

The cooling cage assembly 10 further includes a first ring 50a and a second ring 50b as illustrated in FIGS. 1 and 2. The first ring 50a is mounted between the first cylindrical part 60 and the stator cooling arrangement 20, whereas the second ring 50b is mounted between the second cylindrical part 70 and the stator cooling arrangement 20.

The first ring 50a includes arcuate sealing portions 52a arranged to cover and seal the arcuate recesses 62 of the first cylindrical part 60. Each arcuate sealing portion 52a includes a first aperture 54a and a second aperture 55a, which are part of the corresponding fluidic bridge of the first plurality of fluidic bridges. The second ring 50b includes arcuate sealing portions 52b arranged to cover and seal the arcuate recesses 72 of the second cylindrical parts 70. Each arcuate sealing portion 52b includes a first aperture 54b and a second aperture 55b, which are part of the corresponding fluidic bridge of the second plurality of fluidic bridges.

As illustrated in FIGS. 1 and 5, the arcuate sealing portions 52a of the first cylindrical part 50 are mounted against the lower side 38 of respective cooling tiles 30 with the first and second apertures 54a, 55a of each arcuate sealing portion 52a aligned with the first and second apertures 39a, 39b of the corresponding tile 30 to form, together with respective arcuate recesses 62 of the first cylindrical part 60, the first plurality of fluidic bridges.

The arcuate sealing portions 52b of the second cylindrical part 70 are mounted partially against the upper side 34 of two adjacent cooling tiles 30 with the first and second apertures 54b, 55b of each arcuate sealing portion 52b aligned respectively with the first aperture 35a of one cooling tile and the second aperture 35b of an adjacent cooling tile to form, together with respective second arcuate recesses 72 of the second cylindrical part 70, the second plurality of fluidic bridges.

The first and second plurality of fluidic bridges thus form, together with the stator cooling arrangement 20, the serpentine flow path for a cooling fluid around the outer circumference of the stator.

As illustrated in FIG. 1, the second cylindrical part 70 further includes on a top side an inlet port 74 and an outlet port 76 extending and opening into adjacent arcuate recesses 72 to circulate a cooling fluid along the serpentine flow path. The inlet and outlet may also be arranged on the first cylindrical part, on the stator cooling arrangement, etc.

The stator 22 includes radial extensions 24, each including a through-hole accommodating a screw 24a screwed into mounting lugs 66 arranged on the first cylindrical part 60. These radial extensions provide for reducing the footprint of the stator cooling arrangement 20 since the cooling tiles 30 are mounted between these radial extensions. With reference to FIG. 4, the stator 22 includes a cylindrical part 23a and teeth 23b extending from an inner side of the cylindrical part along a radial direction. To obtain a reduced footprint, the thickness t1 of the cylindrical part 23a between the tile receiving portion 29 and its inner side is smaller than the thickness of cylindrical part of conventional stators for rotary electric motors. The thickness t1 may be, for example, less than a third of the length t2 of the teeth 23b along the radial direction.

Figure 7:
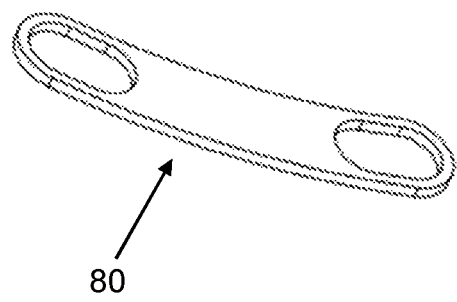
FIG. 7 is a perspective view of sealing gaskets.
Figure 7:
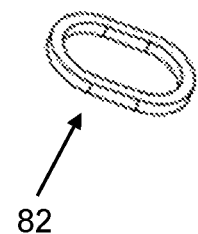

The first and second cylindrical parts 60, 70, the first and second rings 50a, 50b, and the cooling tiles 30 are adapted to accommodate sealing gaskets 80, 82, as illustrated in FIG. 7, to seal the serpentine flow path. The configuration of these parts facilitates the sealing operation during the assembly of the cooling cage assembly 10.

To this end, the first cylindrical part 60 includes an arcuate shoulder 64 around each arcuate recess 62. An arcuate sealing gasket 80 is arranged and squeezed against the shoulder 64 of each arcuate recess 62 and against a flat surface of a lower side of the first ring 50a. An upper side of the first ring 50a, mounted against the lower side 38 of each cooling tile 30, includes a shoulder 56 around each aperture 54a, 55a of respective arcuate sealing portions 52a. An elongated sealing gasket 82 is arranged and squeezed against the shoulder 56 of each aperture and against the lower side 38 of respective cooling tiles 30.

A shoulder 36 is arranged around the first and second apertures 35a, 35b arranged on the upper side 34 of each tile 30. An elongated sealing gasket 82 is arranged and squeezed against the shoulder 36 of each aperture 35a, 35b of respective cooling tiles 30 and against a flat surface of a lower side of the second ring 50b. An upper side of the second ring 50b includes arcuate grooves. An arcuate sealing gasket 80 is mounted inside each arcuate groove and squeezed against a flat surface of the second cylindrical part 70.

The shoulders arranged on first cylindrical part 60, on the first and second rings 50a, 50b, and on the cooling tiles 30 are therefore always facing upwardly. The sealing gaskets may therefore be placed to rest on their corresponding shoulder as the different parts are mounted on top of each other during the assembly process.

More particularly, arcuate sealing gaskets 80 are disposed on the shoulders 64 around the arcuate recesses 62 of the first cylindrical part 60. The lower side of the first ring 50a is then placed on top of first cylindrical part and sealing gasket 82 are disposed on the shoulders 56 around the apertures 54a, 54b. The stator cooling arrangement is then placed on top of the first ring 50a, and the screws 24a arranged in the radial extensions 24 of the stator are then screwed into mounting lugs 66 of the first cylindrical part 60, thereby squeezing the sealing gaskets between the different parts.

Sealing gaskets 82 are then disposed on the shoulder 36 around the first and second apertures 35a, 35b of each cooling tile 30 before placing the second ring on top of the cooling stator arrangement 20. Arcuate sealing gaskets 80 are disposed inside each arcuate groove on the upper side of the second ring 50b, and the second cylindrical part 70 is placed on top of the second ring 50b. Finally, the cooling stator arrangement 20, the second ring 50b, and the second cylindrical part 70 are screwed together by screws 78, thereby squeezing the sealing gaskets therebetween.

Fluidic bridges may have other configurations. For example, the fluidic bridges may be formed integrally in the first and second cylindrical parts in contact with opposite sides of the cooling stator arrangement. The first cylindrical part may include a first series of U-shaped channels regularly spaced apart from each other over 360° with apertures opening to the annular side in contact with one side of the stator cooling arrangement to provide fluid communication between the first and second channels of respective cooling tile.

The second cylindrical part may include a second series of U-shaped channels which are angularly offset with respect with the first series of U-shaped channels and with apertures opening to the annular side in contact with the opposite side of the stator cooling arrangement to provide fluid communication between one channel of respective cooling tiles and with one channel of an adjacent cooling tile. In such an arrangement, the cooling cage assembly does not include the first and second rings described above.

Additionally, for example, although each cooling tile of the illustrated example embodiment includes two distinct channels, the tiles may include only one channel to provide a cooling cage assembly with a simpler construction. In such a configuration, each fluidic bridge of the first and second fluidic bridges are arranged respectively on the upper side and on the lower side of the cooling tiles to extend respectively above and below two adjacent cooling tiles to bring in fluid communication the channel of respective two adjacent cooling tiles so as to form the serpentine flow path.

LIST OF REFERENCE NUMERALS

10 Cooling cage assembly
20 Cooling stator arrangement
22 Stator
23a Cylindrical part
23b Teeth
24 Radial extensions
24a Screws
25 Tail
26 Rail
28 Rod
29 Tile receiving surface
30 Cooling tiles
31 First channel
32 Second channel
34 Upper side
35a First aperture
35b Second aperture
36 Shoulders
38 Lower side
39a First aperture
39b Second aperture
40 Inner side
42 Socket
44 Outer side
45 Through-holes
46 Screws
50a First ring
50b Second ring
52a Arcuate sealing portion
52b Arcuate sealing portion
54a First aperture
54b First aperture
55a Second aperture
55b Second aperture
56 Shoulder
60 First cylindrical part
62 Arcuate recesses
64 Shoulder
66 Mounting lugs
70 Second cylindrical part
72 Arcuate recesses
74 Inlet port
76 Outlet port
78 Screws
80 Arcuate sealing gaskets
82 Elongated sealing gaskets

What is claims is:

1. A cooling cage assembly for a rotary electric motor, comprising:
    a cooling stator arrangement including a stator and cooling tiles mounted against and around an outer circumference of the stator, each cooling tile including an upper side, a lower side, and at least one channel extending from the upper side of the cooling tile to the lower side of the cooling tile;
    a first plurality of fluidic bridges arranged on the upper side of the cooling tiles;
    a second plurality of fluidic bridges arranged on the lower side of the cooling tiles;
    a first cylindrical part fixedly mounted against a first side of the cooling stator arrangement; and
    a second cylindrical part fixedly mounted against a second side of the cooling stator arrangement opposite the first side of the cooling stator arrangement;
    wherein a serpentine flow path, for a cooling fluid, around the outer circumference of the stator is formed by the first plurality of fluidic bridges, the second plurality of fluidic bridges, and the channel of the cooling tiles; and
    wherein each cooling tile is arranged as a stand-alone component removably assembled, individually and independently from each other cooling tile, against a corresponding tile-receiving surface of the outer circumference of the stator.

2. The cooling cage assembly according to claim 1, wherein each cooling tile includes a first channel and a second channel extending from the upper side of the cooling tile to the lower side of the cooling tile, each fluidic bridge of the first plurality of fluidic bridges being in fluid communication with the first channel and the second channels of a respective cooling tile, each fluidic bridge of the second plurality of fluidic bridges being in fluid communication with one channel of a first respective cooling tile and with one channel of a second respective cooling tile adjacent the first respective cooling tile, to form the serpentine flow path.

3. The cooling cage assembly according to claim 1, wherein the first plurality of fluidic bridges includes first arcuate recesses arranged on an end side of a first one of the first and second cylindrical parts, the first arcuate recesses being regularly spaced apart from each other over 360°, the second plurality of fluidic bridges including second arcuate recesses arranged on an end side of a second one of the first and second cylindrical parts, the second arcuate recesses being regularly spaced apart from each other over 360°, the first arcuate recesses being angularly offset with respect to the second arcuate recesses.

4. The cooling cage assembly according to claim 3, further comprising a first ring and a second ring, the first ring including first arcuate sealing portions adapted to cover and seal the arcuate recesses of the first one of the first and second cylindrical parts, each first arcuate sealing portion including a first aperture and a second aperture that are parts of a first one of the first and second plurality of fluidic bridges, the second ring including second arcuate sealing portions adapted to cover and seal the arcuate recesses of the second one of the first and second cylindrical parts, each second arcuate sealing portion including a first aperture and a second aperture that are parts of a second one of the first and second plurality of fluidic bridges.

5. The cooling cage assembly according to claim 4, wherein the first ring is mounted between the first cylindrical part and the cooling stator arrangement, the first arcuate sealing portions being mounted against the lower side of the cooling tiles with the first and second apertures of the first arcuate sealing portion aligned with first and second channels of the cooling tile to form, together with respective first arcuate recesses of the first cylindrical part, the first plurality of fluidic bridges; and wherein the second ring is mounted between the second cylindrical part and the cooling stator arrangement, the second arcuate sealing portions being mounted partially against the upper side of two adjacent cooling tiles with the first and second apertures of the second arcuate sealing portion aligned respectively with the first channel of one cooling tile and the second channel of an adjacent cooling tile to form, together with respective second arcuate recesses of the second cylindrical part, the second plurality of fluidic bridges.

6. The cooling cage assembly according to claim 4, wherein a side of the first ring mounted against the lower side of each cooling tile includes a shoulder around each aperture of the first arcuate sealing portions, a sealing gasket being arranged and pressed against the shoulder and against the lower side of the respective cooling tile.

7. The cooling cage assembly according to claim 4, wherein the first cylindrical part includes a shoulder around each first arcuate recess, an arcuate sealing gasket being arranged and pressed against the shoulder of each first arcuate recess and against a flat surface of the first ring.

8. The cooling cage assembly according to claim 4, wherein the second arcuate sealing portions include arcuate grooves, an arcuate sealing gasket being mounted inside each arcuate groove and pressed against a flat surface of the second cylindrical part.

9. The cooling cage assembly according to claim 4, wherein the upper side of each cooling tile includes a first aperture and a second aperture opening into first and second channels of the tile, a shoulder being arranged around each first and second aperture of each tile, a sealing gasket being arranged and pressed against the shoulder of each aperture of each cooling tile and against a flat surface of the second ring.

10. The cooling cage assembly according to claim 1, wherein the stator includes radial extensions, an inner side of each cooling tile being mounted against the corresponding tile receiving surface between two radial extensions.

11. The cooling cage assembly according to claim 10, wherein each cooling tile is mounted against the corresponding tile receiving surface by a sliding dovetail.

12. The cooling cage assembly according to claim 10, wherein each cooling tile includes a socket extending along an inner side from the upper side to the lower side of the cooling tile, each tile receiving surface including a tail slidably mounted in the socket of a respective cooling tile.

13. The cooling cage assembly according to claim 10, wherein each radial extension is arranged in a circumferential gap located between a respective adjacent pair of the cooling tiles.

14. The cooling cage assembly according to claim 1, wherein each cooling tile is formed of a deformable material, a radius of curvature of an inner side of each cooling tile being smaller than a radius of curvature of the corresponding tile receiving surface of the stator before assembly, each cooling tile being bent to a shape of the corresponding tile receiving surface by being screwed against the corresponding tile receiving surface.

15. The cooling cage assembly according to claim 14, wherein the deformable material includes an aluminum material.

16. The cooling cage assembly according to claim 1, wherein one of the first and second cylindrical parts includes an inlet port and an outlet port in fluid communication with the cooling stator arrangement.

17. The cooling cage assembly according to claim 1, wherein one of the first and second cylindrical parts includes an inlet port in fluid communication with the cooling stator arrangement.

18. The cooling cage assembly according to claim 1, wherein one of the first and second cylindrical parts includes an outlet port in fluid communication with the cooling stator arrangement.

19. The cooling cage assembly according to claim 1, further comprising an inlet port and an outlet port in fluid communication with the cooling stator arrangement.

20. The cooling cage assembly according to claim 1, wherein an inner side of each cooling tile is thermally coupled to the corresponding tile receiving surface of the stator.

21. A rotary electric motor, comprising:
a cooling cage assembly including:
a cooling stator arrangement including a stator and cooling tiles mounted against and around an outer circumference of the stator, each cooling tile including an upper side, a lower side, and at least one channel extending from the upper side of the cooling tile to the lower side of the cooling tile;
a first plurality of fluidic bridges arranged on the upper side of the cooling tiles;
a second plurality of fluidic bridges arranged on the lower side of the cooling tiles;
a first cylindrical part fixedly mounted against a first side of the cooling stator arrangement; and
a second cylindrical part fixedly mounted against a second side of the cooling stator arrangement opposite the first side of the cooling stator arrangement;
wherein a serpentine flow path, for a cooling fluid, around the outer circumference of the stator is formed by the first plurality of fluidic bridges, the second plurality of fluidic bridges, and the channel of the cooling tiles; and
wherein each cooling tile is arranged as a stand-alone component removably assembled, individually and independently from each other cooling tile, against a corresponding tile-receiving surface of the outer circumference of the stator.

* * * * *